United States Patent
Penninckx et al.

(10) Patent No.: US 6,317,240 B1
(45) Date of Patent: Nov. 13, 2001

(54) SYSTEM FOR AND A METHOD OF COMPENSATING POLARIZATION DISPERSION IN AN OPTICAL TRANSMISSION SYSTEM

(75) Inventors: Denis Penninckx, Nozay; Fabien Roy, Les Ulis, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/523,190

(22) Filed: Mar. 10, 2000

(30) Foreign Application Priority Data

Mar. 31, 1999 (FR) .................................................. 99 04058

(51) Int. Cl.⁷ .................................................. H04B 10/00
(52) U.S. Cl. .............................. 359/161; 385/11; 359/156
(58) Field of Search ...................... 385/11, 124; 359/161, 359/156

(56) References Cited

U.S. PATENT DOCUMENTS

| | | |
|---|---|---|
| 5,404,413 | 4/1995 | Delavaux et al. . |
| 5,473,457 * | 12/1995 | Ono ...................................... 359/161 |
| 5,587,827 | 12/1996 | Hakimi et al. . |
| 5,930,414 * | 7/1999 | Fishman ................................. 385/11 |

FOREIGN PATENT DOCUMENTS 0 853 395 A1   7/1998   (EP) .

OTHER PUBLICATIONS

D. Schlump et al. "Electronic equalization of PMD and chromatic dispersion induced distortion after 100 km standard fibre at 10 Gbits/s", ECOC'98, Sep. 1998, pp. 535–536.*

J. Cameron et al. "Limitations of first–order PMD compensation techniques in the presence of chromatic dispersion", Opt. Comm. 171(1999), pp. 15–21.*

Noe et al.: "Fiber–based distributed PMD compensation at 20 Gb/s" European Conference on Optical Communication (ECOC '98) Sep. 20–24, 1998, pp. 157–159 XP00216316 Madrid, Spain.

Schlump et al.: "Electronic Equalisation of PMD and chromatic dispersion induced distorsion after 100 km standard fibre at 10 Gbit/s" European Conference on Optical Communication (ECOC' 98) Sep. 20–24, 1998, pp. 535–536, XP002126317.

* cited by examiner

Primary Examiner—Darren Schuberg
Assistant Examiner—Leo Boutsikaris
(74) Attorney, Agent, or Firm—Sughrue, Mion, Zinn, Macpeak & Seas, PLLC

(57) ABSTRACT

To increase the bit rate and distance of transmission of data by optical fiber, the system compensates polarization dispersion of the link by means of a polarization controller, a differential delay generator for generating a differential delay between two orthogonal polarization modes and a control unit for the polarization controller. It further includes a chromatic dispersion compensator inserted in the link and which applies a fixed value of compensation which minimizes the error rate of the signals received after transmission. Application to long-haul optical transmission via standard fibers.

7 Claims, 2 Drawing Sheets

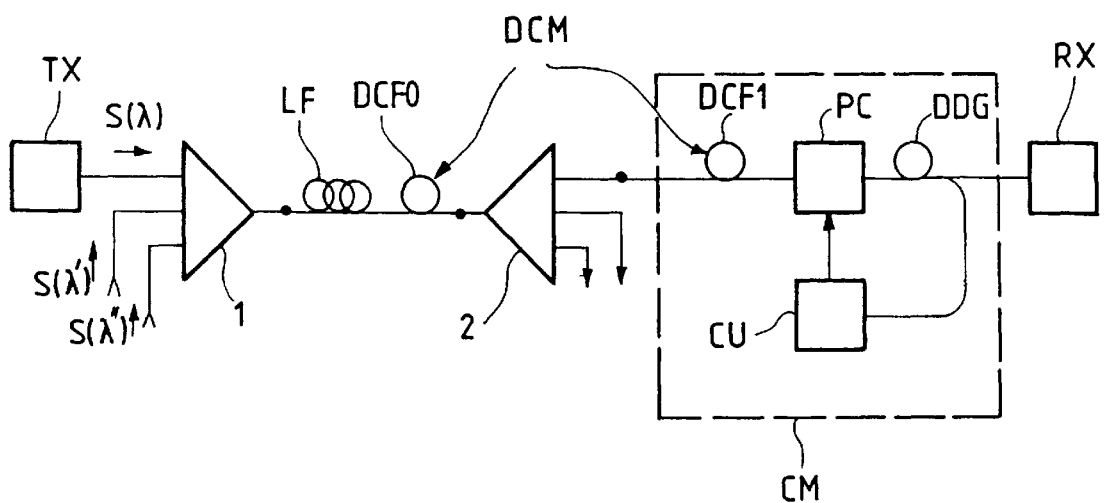
FIG_1
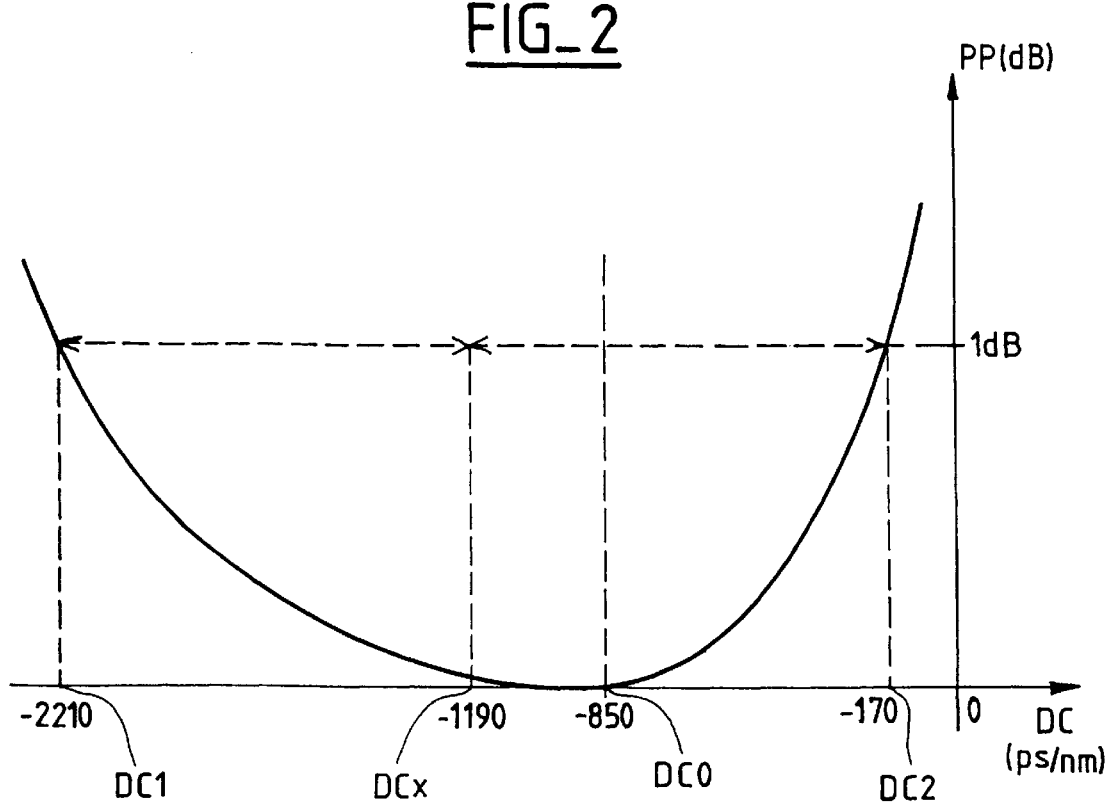
FIG_2

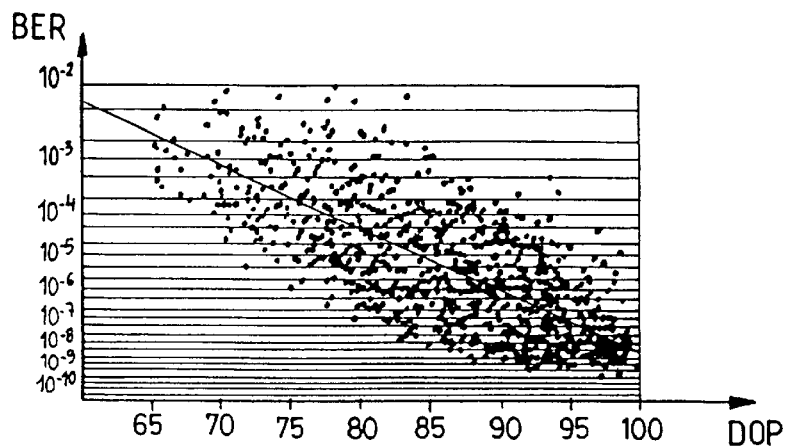
FIG_3
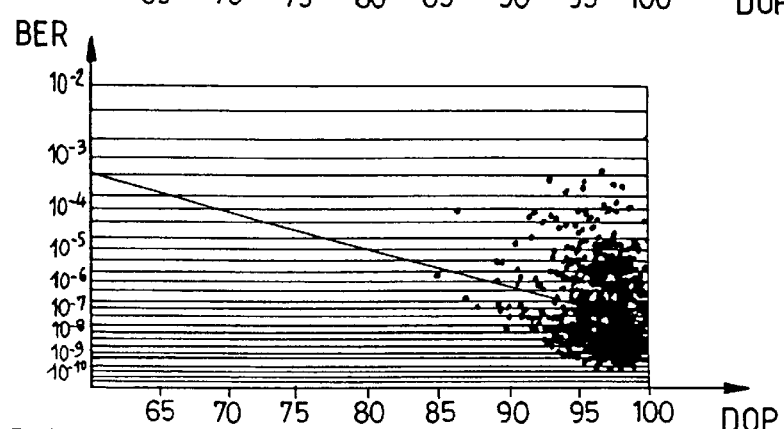
FIG_4
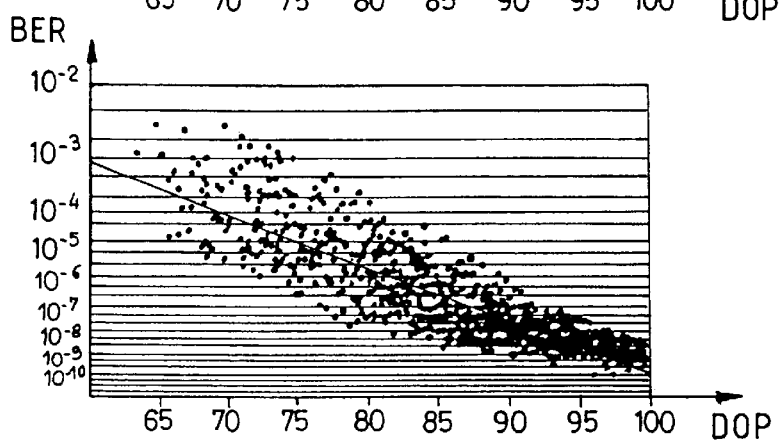
FIG_5
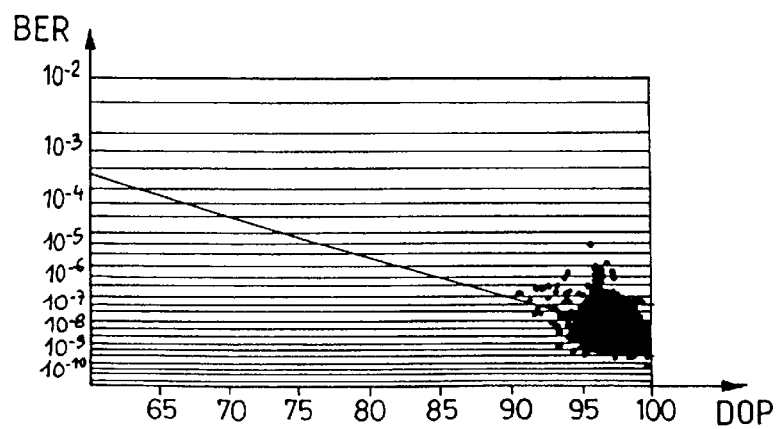
FIG_6

SYSTEM FOR AND A METHOD OF COMPENSATING POLARIZATION DISPERSION IN AN OPTICAL TRANSMISSION SYSTEM

The field of the invention is that of transmitting signals by optical means and more particularly transmission at high bit rates on long-haul links using optical fibers.

The invention concerns a system for dynamically compensating at least some of the polarization dispersion observed in fiber optic transmission systems.

BACKGROUND OF THE INVENTION

A fiber optic transmission system typically includes:
- a transmitter terminal modulating the optical frequency and/or power of at least one optical carrier wave as a function of the information to be transmitted,
- an optical transmission link consisting of at least one monomode fiber section conveying the signal output by the transmitter terminal, and
- a receiver terminal receiving the optical signal transmitted via the fiber.

The performance of an optical transmission system, in particular in terms of signal quality and bit rate, is limited in particular by optical properties of the link, which is subject to physical phenomena which degrade the optical signals. Of all the phenomena that have been identified, attenuation of the optical power and chromatic dispersion were initially seen as the most severe, and means have been proposed for at least partly remedying the degradation they cause.

The attenuation in fibers of a given type depends on the signal carrier wavelength. Accordingly, monomode fibers installed during the last ten years, referred to as "standard fibers", have minimum attenuation at a wavelength of around 1.5 $\mu$m, which makes it beneficial to choose that value for the carriers.

Also, to increase transmission distances further, it has been possible to compensate attenuation by means of optical amplifiers at the upstream or downstream end of the link or all along the link.

Chromatic dispersion also depends on wavelength. For standard fibers, there is zero chromatic dispersion at 1.3 $\mu$m and approximately 1.7 ps/(km.nm) of chromatic dispersion at 1.5 pm. The low attenuation at 1.5 $\mu$m has led to the development of new fibers, referred to as "dispersion shifted fibers", for which there is zero chromatic dispersion at that wavelength.

Attempts have also been made to correct the effects of chromatic dispersion at 1.5 pm in existing installed standard fibers, in order to improve their performance.

One solution is to insert into the link at least one dispersion compensating fiber (DCF). To compensate the chromatic dispersion exactly, it is sufficient for the dispersion compensating fiber to have a length and dispersion characteristics such that the cumulative dispersion along the compensating fiber is equal and opposite to that along the transmission link fiber.

A residual cumulative dispersion value DR for the whole of the link, including the compensating fiber(s), can be defined as the algebraic sum of the cumulative dispersions DL and DC of the dispersion compensating fiber(s) and the transmission link fiber. In mathematical terms, this can be expressed by the following equation:

$$DR=DC+DL=\int D_1(z_1) \cdot dz_1 + \int D_2(Z_2) \cdot dZ_2 \quad (1)$$

where $z_1$ and $z_2$ are respectively the abscissae of points along the dispersion compensating fiber and along the associated link, $D_1$ and $D_2$ are respectively the chromatic dispersion parameters at the abscissae $z_1$ and $z_2$ of the dispersion compensating fiber and the transmission link fiber and the integrals which express the cumulative dispersions DC and DL are respectively calculated along the dispersion compensating fiber and along the associated transmission link fiber, taking the wave propagation direction as the positive direction.

The dispersion parameter D is related to the propagation constant $\beta$ by the following equation:

$$d^2\beta/d\omega^2 = -(2\pi c/\omega^2)D$$

where $\omega$ is the angular frequency of the wave and c is the speed of light in a vacuum.

The condition for exact compensation of the chromatic dispersion is therefore DR=DC+DL=0.

In reality, the optimum of exact compensation of chromatic dispersion is never achieved because the quality of the compensated signal received also depends on other transmission parameters, in particular the type of modulation of the transmitted signal. This applies in particular if the transmitted signal is "chirped", i.e. if optical frequency modulation accompanies any amplitude modulation.

In fact, such compensation is imposed only if required, i.e. for transmission conditions (fiber type, modulation type, transmission distance and bit rates) which, without compensation, would lead to error rates exceeding a commercially acceptable limit value, typically $10^{-15}$. Moreover, to minimize the cost of the dispersion compensating fiber, a minimum compensation value compatible with the required error rate is normally chosen. Accordingly, on sufficiently short links, no attempt at all is made to compensate chromatic dispersion.

Until now, the forms of compensation referred to above have been treated independently and without regard to another unfavorable phenomenon referred to as "modal polarization dispersion". Under existing optical transmission system operating conditions, this phenomenon has long been regarded as negligible compared with chromatic dispersion. This no longer applies if further attempts are made to increase the length of the link and above all the bit rate.

Fibers are subject to polarization dispersion even in the absence of chromatic dispersion in the usual sense, and even though the carrier wave supplied by a laser diode at the transmitter is totally polarized. One effect of polarization dispersion is that, when it is received after propagating in a fiber, a pulse output by the transmitter terminal is distorted and has a duration greater than its original duration.

This distortion is due to birefringence of the fiber, which depolarizes the optical signal during transmission. To a first approximation, the signal received at the end of the line fiber can be considered as made up of two orthogonal components, one corresponding to a state of polarization for which the propagation speed is a maximum (fastest principal state of polarization) and the other corresponding to a polarization state for which the propagation speed is a minimum (slowest principal state of polarization). In other words, an impulse signal received at the end of the line fiber can be considered to be made up of a first impulse signal with a privileged state of polarization and arriving first and a second impulse signal propagating in a delayed state of propagation and arriving with a differential group delay (DGD) which depends in particular on the length of the line fiber. These two principal states of polarization (PSP) therefore characterize the link.

Consequently, if the transmitter terminal outputs an optical signal consisting of a very brief pulse, the optical signal received by the receiver terminal is made up of two successive and orthogonally polarized pulses having a relative time shift equal to the DGD. As detection by the terminal entails providing in electrical form a measurement of the total optical power received, the detected pulse will have a temporal width increased as a function of the DGD value.

The delay can be in the order of 50 picoseconds for a standard fiber 100 kilometers long. The distortion of the pulses received by the receiver terminal can cause errors in decoding the transmitted data, and polarization dispersion therefore constitutes a factor limiting the performance of optical links, whether analog or digital.

At present monomode fibers can be fabricated with low polarization dispersion (approximately 0.05 ps/km). However, the problem remains in the case of installed "standard" fibers, which have very high polarization dispersion constituting a major technical obstacle to increasing the transmitted bit rates. The problem will also occur on seeking to increase further the bit rate of low polarization dispersion fibers.

Fibers with high polarization dispersion, also referred to as polarization maintaining fibers (PMF), can be used in short lengths to procure a fixed differential delay with invariant principal states of polarization. Polarization dispersion can be compensated optically by judicially placing a component of this kind (or any system for generating a differential delay between two orthogonal polarization modes) in series with a transmission link subject to polarization dispersion. This can be achieved either by using a polarization maintaining fiber with the same differential delay as the link, but interchanging the slow and fast principal states of polarization, or by making a principal state of polarization of the combination of the link and the polarization maintaining fiber coincide with the state of polarization of the source of the transmission. This is done using a polarization controller between the link and the polarization maintaining fiber.

One important aspect of modal polarization dispersion is that the differential delay DGD and the principal states of polarization of a link vary in time as a function of many factors, including vibration and temperature. Accordingly, unlike chromatic dispersion, polarization dispersion must be considered a random phenomenon. In particular, the polarization dispersion of a link is characterized by a polarization mode dispersion delay (PMD) defined as the average value of the measured DGD. To be more precise, it can be shown that the polarization dispersion can be represented by a vector of random rotation O in the Stokes vector space usually employed to represent the states of polarization by means of the Poincare sphere.

Another consequence of this random aspect is that a compensator system must be adaptive, and the differential delay of the polarization maintaining fiber must be made at least equal to the differential delay values to be compensated. A compensator system of the above kind is described in European Patent Application EP-A-853 395 filed Dec. 30, 1997 and published Jul. 15, 1998.

A problem which has come to light in research on PMD compensation is the combined influence of polarization dispersion and chromatic dispersion. It has become apparent that in reality PMD compensation is highly sensitive to the residual chromatic dispersion of the link as a whole, and therefore to the existence and amount of chromatic dispersion compensation.

In particular, it has been found necessary to introduce precise chromatic dispersion compensation even on links where such compensation would not have been necessary in the absence of PMD.

It has also become apparent that the optimum chromatic dispersion compensation to be applied in the presence of PMD does not always correspond to the optimum compensation that would be applied in the absence of PMD.

OBJECTS AND SUMMARY OF THE INVENTION

An object of the invention is to improve the effectiveness of polarization dispersion compensation by taking account of the foregoing remarks.

To this end, the invention proposes a compensator system for an optical transmission system including a transmitter terminal adapted to output a polarized optical signal, a transmission optical fiber, possibly optical amplifiers and a receiver terminal, the compensator system including a first polarization dispersion compensator including:

a polarization controller, a differential delay generator for generating a differential delay between two orthogonal polarization modes, said controller and said generator being inserted between the transmission fiber and the receiver terminal, in that order, and a control unit for controlling the polarization controller, the system further including a second chromatic dispersion compensator inserted between said transmitter and receiver terminals, said second compensator applying compensation of fixed value which tends to minimize the error rate of signals received by the receiver terminal.

However, it is not always easy to determine directly the chromatic dispersion compensation value that minimizes the error rate. Because of the random nature of PMD, any such method would necessitate lengthy experiment or simulation.

In practice, this value can be defined indirectly using a power penalty curve established as a function of the chromatic dispersion compensation applied in a link having the same optical properties but no polarization dispersion. The power penalty for a given value of chromatic dispersion compensation is then measured by the ratio (expressed in dB) of the minimum average powers that the received signal must have to retain the same error rate at the receiver on the one hand with the given compensation value and on the other hand with the compensation required for the lowest minimum average power.

Also, according to a particular aspect of the invention, said fixed compensation value is equal to the average of a minimum chromatic dispersion compensation value and a maximum chromatic dispersion compensation value for which a power penalty established as a function of the chromatic dispersion compensation applied is in the order of 1 dB.

Thus, the compensation to be applied is determined without regard to the inherently random nature of PMD, but the proposed solution allows for this random aspect by improving the tolerance of the system to chromatic dispersion.

The invention also provides a compensation method corresponding to the system defined above. This method applies a first stage of polarization dispersion compensation and it also provides a second stage of chromatic dispersion compensation using a chromatic dispersion compensator inserted between said transmitter and receiver terminals, said second stage of compensation having a fixed value which tends to minimize the error rate of signals received by the receiver terminal.

The invention further provides an optical transmission system including the compensator system defined above.

The system can be a single-channel system, i.e. designed to convey a signal carried by a single wavelength, or a wavelength division multiplex (WDM) system, i.e. designed to convey a signal made up of several channels carried by different wavelengths. In the later case, specific compensation is required for each channel. The system according to the invention then includes means for extracting a channel and a compensator system associated with that channel.

BRIEF DESCRIPTION OF THE DRAWINGS

Other aspects and advantages of the invention become apparent in the course of the following description, which is given with reference to the drawings.

FIG. 1 is a block diagram of an optical transmission system including a compensator system according to the invention.

FIG. 2 is a curve of power penalty as a function of chromatic dispersion compensation applied in a link on which there is no polarization dispersion.

FIGS. 3 to 6 how experimental measured error rate curves illustrating the effectiveness of compensation in accordance with the invention.

MORE DETAILED DESCRIPTION

FIG. 1 is a block diagram of one example of an optical transmission system including a compensator system according to the invention.

The system shown by way of example is a wavelength division multiplex system in which a plurality of channels S$\lambda$, S$\lambda$', S$\lambda$" have respective carrier wavelengths $\lambda$, $\lambda$', $\lambda$". Each channel, for example channel S$\lambda$, originates at a transmitter terminal TX which outputs an optical signal taking the form of an amplitude (and/or optical frequency) modulated polarized carrier wave. The channels are combined in a multiplexer 1 whose output is connected to an optical transmission link. The link typically includes an optical fiber LF and can include optical amplifiers (not shown) at the upstream and/or downstream end of the fiber. The link can equally include a plurality of fiber sections with optical amplifiers between them.

The end of the link is connected to a receiver terminal RX via a demultiplexer 2 whose function is to extract the channel addressed to the receiver RX.

The system includes a polarization dispersion compensator CM between the demultiplexer 2 and the receiver RX, said compensator including:
- a polarization controller PC,
- a differential delay generator DDG for generating a differential delay between two orthogonal polarization modes, said controller and said generator being inserted between the transmission fiber and the receiver terminal, in that order, and
- a control unit CU controlling the polarization controller PC.

The detailed construction of the compensator CM is described and corresponding explanations are given in the aforementioned European Patent Application EP-A-853 395. The function of the control unit CU is to maximize the degree of polarization of the signal from the differential delay generator DDG, for example, which is typically in the form of a polarization maintaining fiber PMF. Other control methods which aim to minimize the error rate can be used, for example control methods which aim to minimize the bandwidth of the modulation of the electrical signal obtained by detecting the optical signal from the differential delay generator DDG.

In accordance with the invention, the compensator system is complemented by a chromatic dispersion compensator DCM. Here this compensator includes a first dispersion compensating fiber DCF0 upstream of the demultiplexer 2 and in series with the transmission fiber LF and a second dispersion compensating fiber DCF1 between the demultiplexer 2 and the receiver RX. This arrangement enables common compensation of all the channels by the fiber DCF0 and specific compensation of each channel by the fiber DCF1.

The dispersion compensating fibers DCF0 and DCF1 apply a fixed compensation DCx which tends to minimize the error rate of the signals received by the receiver terminal RX.

A single-channel system differs from that described above in that the multiplexer 1 and the demultiplexer 2 are absent.

Ignoring other phenomena, such as non-linear effects, the location of the dispersion compensating fiber(s) which constitute(s) the chromatic dispersion compensator DCM is not critical because only the residual chromatic dispersion of the link as a whole matters. However, for practical reasons, it may be preferable for the dispersion compensating fiber(s) to be near the receiver.

As already mentioned, it is not easy to determine the chromatic dispersion compensation value which minimizes the error rate by direct measurement of the error rate on signals transmitted via a link which is subject to PMD. The random nature of PMD necessitates statistical methods, which are very costly in terms of experiment or simulation time.

To overcome this difficulty, it is proposed to determine the chromatic dispersion compensation value by means of a power penalty curve established as a function of the chromatic dispersion compensation applied to a link having the same optical properties but not subject to polarization dispersion. A solution of this kind therefore circumvents the random nature of PMD.

In the present context, the power penalty for a given chromatic dispersion compensation value is defined for a link with no PMD as the ratio (expressed in dB) of the minimum average powers that the received signal must have to retain the same error rate at the receiver on the one hand with the aforementioned given compensation value and on the other hand with the compensation value that the smallest minimum average power would require.

The curve can be obtained by simulation or experiment using a fiber with very low polarization dispersion but otherwise equivalent to the actual link to be compensated.

FIG. 2 shows an example of the above kind of power penalty curve for the specific case of a negative "chirp" NRZ signal a transmitted at a bit rate of 10 Gbit/s on 100 km of standard fiber [D=17 ps/(nm.km)].

The power penalty PP is expressed in decibels and the chromatic dispersion compensation DC is expressed in picoseconds per nanometer.

Note first that a penalty of approximately 1 dB is obtained for two values, DC1=−2 210 ps/nm and DC2=−170 ps/nm. Given the steep slope of the curve short of DC1 and beyond DC2, these values constitute limits between which would lie acceptable compensation values in the absence of PMD.

A conventional approach to determining the compensation to be applied would therefore be to choose the lowest value that corresponds to a required penalty, for economic reasons. However, this criterion is generally not acceptable if PMD is taken into account. To the contrary, chromatic dispersion compensation must then take a precise value which ensures maximum tolerance to the random nature of PMD.

This can be explained by the fact that the differential delay and the principal states of polarization of the link depend on the optical frequency (higher order effects). To a first approximation, the effect of the random nature of PMD is therefore to subject the penalty curve for the real link to random translatory shifts about a compensation average point.

The proposed solution aims to evaluate this average point in practice by choosing the compensation value DCx which is equal to the average of the minimum chromatic dispersion compensation value DC1 and the maximum chromatic dispersion compensation value DC2 for which the power penalty is in the order of 1 dB. In the example shown, DCx=−1190 ps/nm.

Also, note that the curve is generally not symmetrical about a vertical line passing through the minimum penalty point corresponding to the compensation value DC0=−850 ps/nm. This implies that the optimum compensation values for links with and without PMD are generally different.

The experimental curves shown in FIGS. 3 to 6 confirm the effectiveness of the solution. Each of these figures represents constellations of points each corresponding to a measured bit error rate (BER) as a function of the degree of polarization (DOP) of the signal from the differential delay generator DDG. Each figure relates to the above transmission example with noise at a constant level added to the signal to limit the duration of the measurements.

FIG. 3 corresponds to the situation in which neither PMD nor chromatic dispersion is compensated.

FIG. 4 corresponds to the situation in which only PMD is compensated.

FIG. 5 corresponds to the situation in which only chromatic dispersion is compensated.

FIG. 6 corresponds to the situation in which PMD and chromatic dispersion are both compensated in accordance with the invention.

FIG. 6 shows the resulting clear statistical improvement of the error rate.

What is claimed is:

1. A compensator system for an optical transmission system including a transmitter terminal adapted to output a polarized optical signal, a transmission optical fiber, possibly optical amplifiers and a receiver terminal, the compensator system including a first polarization dispersion compensator including:

a polarization controller, a differential delay generator for generating a differential delay between two orthogonal polarization modes, said controller and said generator being inserted between the transmission fiber and the receiver terminal, in that order, and a control unit for controlling the polarization controller, the system further including a second chromatic dispersion compensator inserted between said transmitter and receiver terminals, said second compensator applying compensation of fixed value which tends to minimize the error rate of signals received by the receiver terminal.

2. A compensator system according to claim 1, wherein said fixed compensation value is equal to the average of a minimum chromatic dispersion compensation value and a maximum chromatic dispersion compensation value for which a power penalty established as a function of the chromatic dispersion compensation applied is in the order of 1 dB for a link having the same optical properties but no polarization dispersion.

3. A method of compensating chromatic dispersion in an optical transmission system including a transmitter terminal adapted to output a polarized optical signal, a transmission optical fiber, possibly optical amplifiers and a receiver terminal, said method applying a first stage of polarization dispersion compensation, and also providing a second stage of chromatic dispersion compensation using a chromatic dispersion compensator inserted between said transmitter and receiver terminals, said second stage of compensation having a fixed value which tends to minimize the error rate of signals received by the receiver terminal.

4. A method according to claim 3, wherein said fixed value is equal to the average of a minimum chromatic dispersion compensation value and a maximum chromatic dispersion compensation value for which a power penalty established as a function of the chromatic dispersion compensation applied is in the order of 1 dB for a link having the same optical properties but no polarization dispersion.

5. An optical transmission system, including a compensator system according to claim 1.

6. An optical transmission system for transmitting signals with a plurality of wavelength division multiplex channels, the system including channel extractor means for extracting a channel and a compensator system associated with the extracted channel and as claimed in claim 1.

7. An optical transmission system according to claim 6, wherein said chromatic dispersion compensator includes a first dispersion compensating fiber upstream of said extractor means and in series with said transmission optical fiber and a second dispersion compensating fiber between said extractor means and said receiver terminal.

* * * * *